(No Model.)
G. H. NUTT.
MACHINE FOR CUTTING WORMS FOR GEARING.
No. 492,966. Patented Mar. 7, 1893.
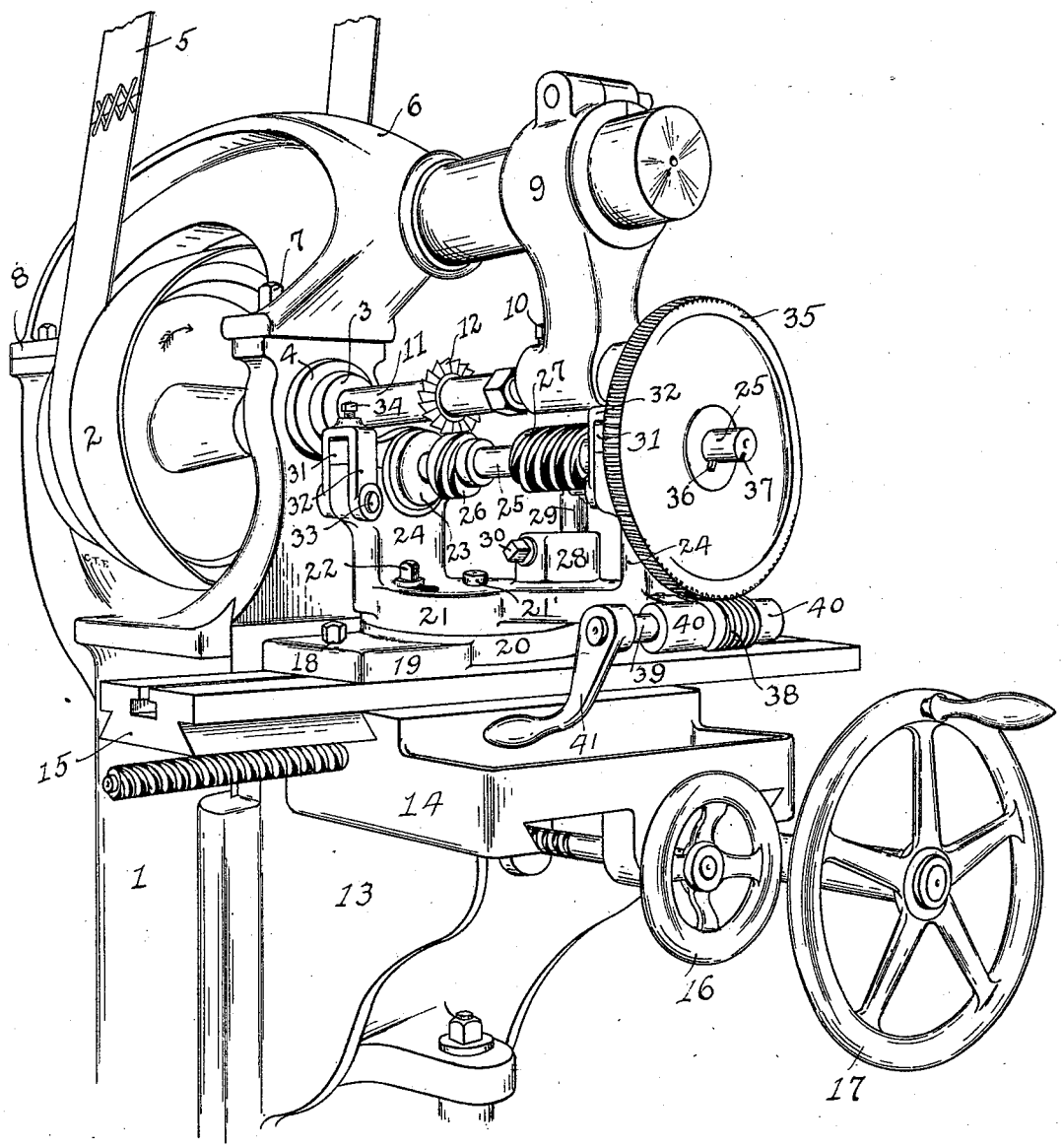
Witnesses
Chas. T. Fletcher
Wm L. Chase
Inventor
George H. Nutt.
By his Attorney
John C. Dewey

UNITED STATES PATENT OFFICE.

GEORGE H. NUTT, OF WORCESTER, MASSACHUSETTS, ASSIGNOR TO THE KNOWLES LOOM WORKS, OF SAME PLACE.

MACHINE FOR CUTTING WORMS FOR GEARING.

SPECIFICATION forming part of Letters Patent No. 492,966, dated March 7, 1893.

Application filed July 22, 1892. Serial No. 440,881. (No model.)

*To all whom it may concern:*

Be it known that I, GEORGE H. NUTT, a citizen of the United States, residing at Worcester, in the county of Worcester and State of Massachusetts, have invented certain new and useful Improvements in Machines for Cutting Worms for Worm-Gearing; and I do hereby declare that the following is a full, clear, and exact description thereof, which, in connection with the drawing making part of this specification, will enable others skilled in the art to which my invention belongs to make and use the same.

My invention relates to machines for cutting worm threads for worm gearing, and the object of my invention is to provide a supplemental attachment for holding, adjusting, and feeding the worm blank, of simple construction and operation, and adapted to be applied to, and combined with an ordinary milling machine.

My invention consists in certain novel features of construction and operation of a supplemental attachment for holding, adjusting, and feeding the worm blank, combined with a milling machine, as will be hereinafter fully described, and the nature thereof indicated by the claims.

The drawing represents a front view of a milling machine of ordinary construction; with my supplemental attachment for holding, adjusting, and feeding the worm blank applied thereto.

In the accompanying drawing, 1 is a part of the main body of the frame of the milling machine. 2 is the cone pulley, mounted on the spindle 3, which is journaled in boxes 4, on the frame, and driven by a belt 5 from a counter shaft, not shown. 6 is the top arch of the frame, bolted to the main frame at 7 and 8, and carrying on its forward end the clamp arm 9 in the lower end of which is fitted the cutter arbor center, fastened in position by a set screw 10, to support the outer end of the cutter arbor 11, upon which is mounted the cutter 12, all of the usual construction and operation in milling machines. The knee 13, slides on dovetail ways on the frame 1, for the vertical adjustment of the machine to the work, in the usual way.

14 is the knee saddle, or main slide, as 15 is the cross slide mounted thereon, and both worked in the usual way by hand wheels 16 and 17, respectively.

I will now proceed to describe my supplemental attachment for holding, adjusting, and feeding the worm blanks. The base 19 is secured to the cross slide 15, to move therewith, by bolts 18, and said base 19 is provided with a circular portion 20 near the center thereof, upon which is mounted to rotate on a pin 21', secured at its lower end in the base 20, the main frame 21, of my attachment. The main frame 21 is rotated on the base 20 to bring the work to be operated on into the proper angle with the cutter. The frame 21 is clamped to the base 20 in any desired position, by the screw 22. Mounted in pipe boxes 23 in the upright arms 24 of the frame, is an arbor 25, upon which is fastened the blank 26, to be cut and the pattern worm 27, which has been previously cut in an engine lathe or otherwise to the pitch of thread desired to be cut on the blank 26. Fitted to adjustably turn in a hole in the hub 28, cast on frame 21, is a pattern worm guide pin 29, the top end of which is shaped to fit the thread on the pattern worm 27; said pin is held in proper adjustment by a set screw 30. The pipe boxes 23 of arbor 25 are held in position on the frame 21 by the caps 31, hinged at the back side on the upright arms 24, and clamped to the frame arms by yokes 32, pivoted to the frame at 33, and fitted with the clamp set screws 34. The pipe box at the forward or outer end of the arbor 25 is cast with the worm gear 35, and is splined to receive the gibbed key 36, which is seated to slide in a spline 37, in the arbor 25. Meshing with the worm gear 35 is a worm 38, mounted on a shaft 39, turning in journals 40 on the frame 21. Fast on the end of shaft 39 is a crank handle 41, by which, through worm 38 and gear 35, the arbor 25 may be turned in its journals to feed the blank 26 against the cutter 12. The arbor 25 being free to slide as well as to revolve in its boxes, the blank 26 will have the thread cut thereon as it is revolved against the cutter 12, to correspond with the pitch of the thread of the pattern worm 27; said pattern worm with the arbor 25, being moved along by the action of the stationary guide pin 29. The size and shape of the cutter 12 must be made in each case to correspond to the thread of the worm to be cut.

I have shown in the drawing the blank arbor 25 driven by worm gearing, as a convenient method of gearing down in the proper proportion; but said arbor may be driven equally as well by a train of spur gearing, if preferred. I have also shown in the drawing the blank arbor boxes secured on the frame by hinged caps, which construction is convenient for putting in and taking out the blank arbor, but which is not essential to the proper working of my attachment. I have also shown in the drawing a hand feeding mechanism for working the attachment, but power feed may be substituted if preferred, and used in substantially the manner common to milling machines, and other machine tools.

The advantage of my improvement will be readily appreciated by those skilled in the art, and it will be seen, that I am enabled to combine my supplemental attachment for holding, adjusting, and feeding the worm blank with an ordinary milling machine, and when the attachment is not in use, it may be removed from the milling machine, which may then be used in the ordinary way.

It will be understood that the details of construction of the supplemental attachment for holding, adjusting, and feeding the worm blank may be varied from what is shown and described, if desired.

Having thus described my invention, what I claim as new, and desire to secure by Letters Patent, is—

1. The combination with a milling machine, a cutter arbor and cutter supported thereon, of a supplemental attachment for holding, adjusting, and feeding the worm blank, consisting of a frame supported and adapted to be revolved on a base secured to the cross slide of the milling machine, said frame carrying an arbor on which is mounted the pattern worm, and the worm blank to be cut, and a guide pin for the pattern worm, and mechanism for feeding the blank against the cutter, substantially as set forth.

2. The combination with a milling machine, a cutter arbor, and cutter supported thereon, of a supplemental attachment for holding, adjusting, and feeding the worm blank, consisting of a frame supported and adapted to be revolved on a base secured to the cross slide of the milling machine, said frame provided with hinged caps and yokes, and carrying an arbor on which is mounted the pattern worm, and the worm blank to be cut, and a guide pin for the pattern worm, and gearing for feeding the blank against the cutter, substantially as set forth.

GEORGE H. NUTT.

Witnesses:
JOHN C. DEWEY,
KATIE FARRELL.